Figure 1:
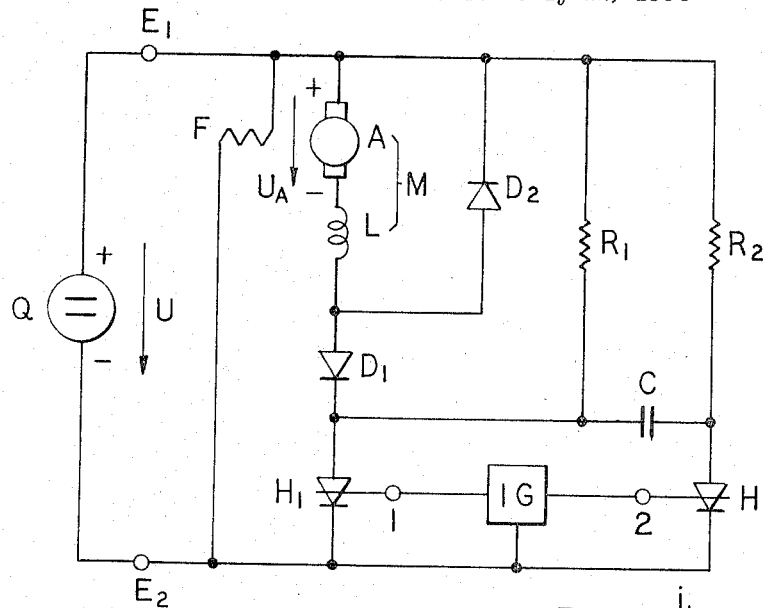

Jan. 16, 1968   E. SCHUEPP   3,364,409
CONTROL SYSTEM FOR A DIRECT-CURRENT MOTOR
Filed July 22, 1964

United States Patent Office 3,364,409
Patented Jan. 16, 1968

3,364,409
CONTROL SYSTEM FOR A DIRECT-CURRENT MOTOR
Eduard Schüepp, 208 Susenbergstrasse,
Zurich, Switzerland
Filed July 22, 1964, Ser. No. 384,411
Claims priority, application Switzerland, July 24, 1963,
9,383/63, 9,384/63
3 Claims. (Cl. 318—345)

This invention relates to controllable direct-current motors and more particular to motors of the type mainly required for direct-current traction vehicles. The control of a D.C. motor is usually effected by connecting series resistances in the armature current circuit thereof or by variation of the exciting field. Series motors are preferably employed for traction purposes; shunt motors have hitherto seldom been used as traction motors on account of their poor adaptability to conditions occurring in electrical traction, though motors displaying shunt action would offer some advantages, for instance when a constant speed of the motor or a constant travelling speed of the vehicle is required. The losses produced in the series resistances represent a predominant drawback in the control of D.C. motors incorporating series resistances.

It is generally known to vary the average D.C. voltage acting on a load in that this voltage is periodically applied to the load, for example by means of an electronic switch. The ratio between the duration of connection of the voltage and the duration of disengagement of the switch determines the average D.C. voltage applied to the load. The control of D.C. motors thus may be carried out also in this manner. Very appropriate for such electronic switches are semi-conductors which usually are called controlled rectifiers since these elements can conduct currents of high intensity and can withstand high blocking voltages. These controlled rectifiers are brought from the blocking condition to conducting condition by means of an ignition pulse at a control electrode. For restoring the blocking condition, these semi-conductors require a quenching circuit which effects a momentary reversal of the polarity of the voltage at the semi-conductor. Such a quenching circuit comprises a capacitor and a second controlled rectifier, in series connection with said controlled rectifier. The ignition of one of the controlled rectifiers causes the quenching of the other. For charging, the capacitor requires a current supply line on each of its two terminals. One of said current supplies is usually provided by the load circuit of the electronic switch. In order to sufficiently load the capacitor and to ensure a perfect quenching operation, the voltage at the controlled blocking rectifier must attain a sufficiently high value. Now, when a direct current motor, particularly a shunt motor or a separately excited motor, is used as load of an electric switch of the mentioned type, equipped with controlled rectifiers, the voltage occurring on the rotating motor armature may exert a disturbing influence on the correct operation of the switch. Since this armature voltage counteracts the supplied D.C. voltage, it prevents a sufficient charging of the quenching capacitor and thus impairs the quenching process.

It is an object of the invention to avoid the said disadvantage, so that a reliable working of the electronic switch will be insured. In the control arrangement according to the invention one diode is connected in series with the motor and a second current path leads to the interconnection of the capacitor and the first controlled rectifier. Upon an increase of voltage at the blocking controlled rectifier situated in the motor current circuit beyond the difference between supply voltage and motor voltage, the motor current circuit will be separated from the electronic switch by means of the diode arranged in series connection with that circuit and the capacitor of the switch is completely charged by the intermediary of the second current path.

When the impedance of a current consumer has an inductive component, high overvoltages are produced thereon immediately after the transition of the switch into the blocking state. Semi-conductor switches, however, generally are sensitive with respect to overvoltages and excessively high voltages cause their rapid destruction. These over-voltages on the semi-conductor switches are usually rendered harmless by parallel connection of damping means which preferably consist of a series circuit of capacitors and damping resistances and wherein the magnetically stored energy is destroyed. In case of highly inductive load impedances, such as they exist in D.C. motors, and in the presence of high load currents great losses occur in the damping members, as the damping members must dissipate a high energy magnetically stored. Moreover, since the remaining overvoltage increases with any increase in current, no insurance is given in case of overloads that the voltage applied on the semi-conductor switches in every case will remain below the limit admissible for the latter.

The invention now permits to avoid the imperfections mentioned. According to the invention the motor—or a plurality of motors—is connected in parallel with a diode. The inductive current now will be compensated after the blocking of the semi-conductor switch through the diode in the motor current circuit. This first results in the advantage that the voltage on the semi-conductor switch by no means can increase beyond the voltage of the voltage source, since the diode has a negligible voltage drop in the forward direction. As a second essential advantage of the circuit according to the invention, there results that the electromagnetic energy stored in the inductances of the motor current circuit is no longer dissipated in the damping means, but will be delivered as useful mechanical driving energy in every switching cycle.

Figure 2:
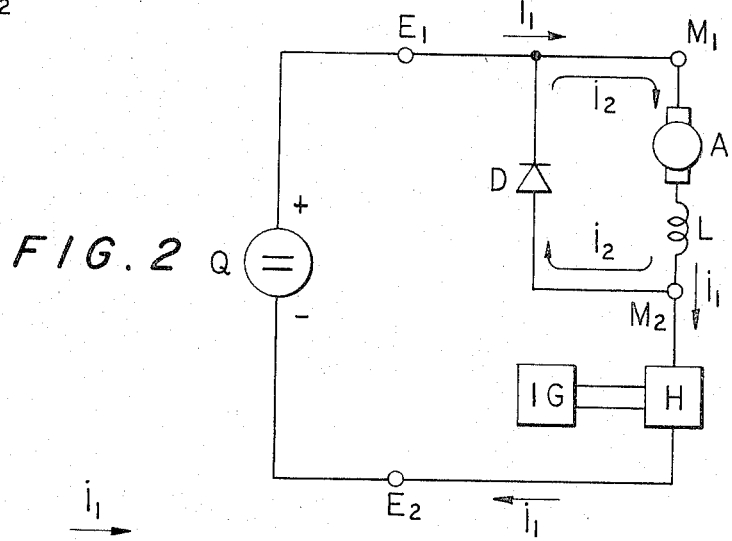
Figure 3:
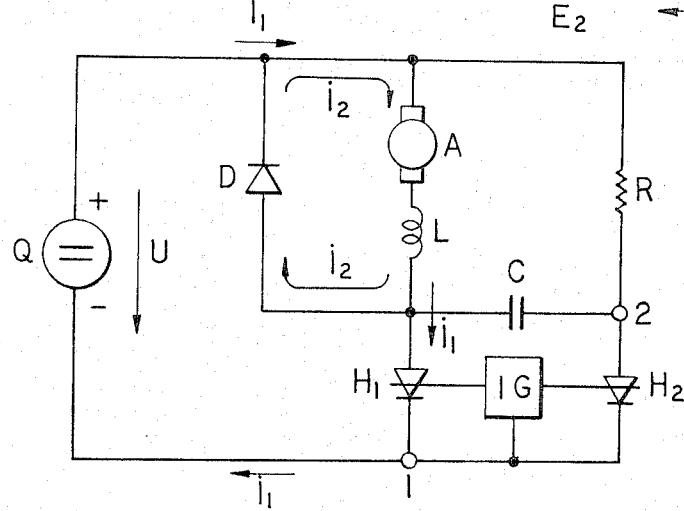

The invention will now be more particularly described by way of example with reference to the accompanying drawings, in which:

FIGURE 1 shows a block wiring diagram of a D.C. motor control for a separately excited D.C. motor, FIGURE 2 depicts a block wiring diagram of a D.C. motor control for a series motor, and FIGURE 3 shows a wiring diagram of a D.C. motor control also for a series motor.

Referring to the wiring diagram according to FIGURE 1, a D.C. motor control comprises a first controlled rectifier $H_1$ and a second controlled rectifier $H_2$, one electrode of each rectifier being connected to the same pole $E_2$ of a voltage supply source Q, whereas the other electrode of the first controlled rectifier is connected via capacitor C with a similar electrode of the second rectifier. Both terminals of the capacitor are connected to one pole of a charging voltage source each by means of a resistor $R_1$ and $R_2$ respectively, while the opposite pole of this source is connected to the directly interconnected electrodes of the controlled rectifiers. In the present embodiment, the supply voltage source Q is utilized as a charging voltage source. The series connection arrangement comprising motor M and diode $D_1$ is connected on the one hand to the interconnection of the controlled rectifier $H_1$ with the capacitor C, and on the other hand to the other pole $E_1$ of the supply voltage source Q. The motor current path M consists of the motor armature A and its inductance L in which the inductance of the armature and the inductances of possibly present interpole windings and series windings are included. The field windings F may be connected to the motor M in shunt arrangement or directly to the voltage source Q, or else may be separately excited. In the present embodiment said field windings are connected directly to the source Q. A pulse emitter IG is provided for the ignition of the controlled rectifiers.

The mode of operation of this connection will subsequently be explained. Ignition pulses are alternately delivered to the control electrodes 1 and 2 by the pulse emitter IG. As a result, the rectifiers $H_1$ and $H_2$ are alternately ignited. When the rectifier $H_1$ is ignited and blocks the rectifier $H_2$, the motor current then flows through the diode $D_1$ and the controlled rectifier $H_1$. These two rectifiers have a negligible voltage drop. The capacitor C is charged by way of the resistor $R_2$. When the control pulse arrives at the electrode 2, the controlled rectifier $H_2$ is ignited. The voltage of the capacitor C is now applied via $H_2$ to the controlled rectifier $H_1$, but it acts on $H_1$ in blocking direction, so that $H_1$ is quenched. The motor current now flows first through the capacitor C and the rectifier $H_2$, while C is reversely loaded. At a large stored energy in the inductance L, the capacitor C can be charged to a very high voltage value, which may be detrimental for the rectifier $H_1$. To prevent this, it may be suitable to connect a diode $D_2$ in parallel with the motor M. This diode $D_2$ causes that the motor current, after the capacitor C has been charged to the source voltage U, is compensated through $D_2$ in the motor current circuit. The diode $D_2$ brings about a voltage limiting effect on the controlled rectifier $H_1$, in that the voltage present on C and thus also on $H_1$ cannot increase beyond the supply voltage U. In addition there results from the current compensation through $D_2$ the further advantage that the energy magnetically stored in the motor inductance L will be delivered as useful mechanical driving energy to the motor. After the reduction of the motor current to zero value and without the presence of the diode $D_1$, the voltage on the capacitor would adjust itself to the difference between the supply voltage U and the armature voltage $U_A$, whereas the capacitor would be insufficiently loaded for the quenching process. This is prevented by the diode $D_1$ and the current path in which the resistor $R_1$ is located. By the intermediary of this current path the capacitor C is fully charged when the rectifier $H_1$ is blocked. With the capacitor charged the diode $D_1$ is biased in blocking direction and thereby precludes any undesired influence of the armature voltage upon the quenching capacitor.

According to the block wiring diagram shown in FIGURE 2 a D.C. motor control for a series motor comprises a semi-conductor switch H which is connected on the one hand to one pole $E_2$ of a D.C. voltage source Q, and on the other hand to one motor terminal $M_2$, and a diode D which is connected on the one hand to the interconnection $M_2$ of motor and semi-conductor switch, on the other hand to the direct connection of the other motor terminal $M_1$ with the other pole $E_1$ of the D.C. voltage source. The inductance of the motor armature A and also the inductances of the field- and interpole windings are illustrated as combined in the inductance L. The motor current circuit $M_1$–$M_2$ may also comprise a plurality of motors connected in series or in parallel arrangement. The semi-conductor switch H is controlled by a pulse emitter IG and alternately brought in conducting and in blocking condition. The pulse emitter may consist for example of an unstable multi-vibrator having variable pulse and pause periods. With the semi-conductor switch in conducting condition, the motor current $i_1$ flows from the pole $E_1$ of the voltage source Q, assumed to be positive, through the motor armature A, the inductance L and the semi-conductor switch H to the negative pole $E_2$ of the voltage source. With the semi-conductor switch blocked, the diode D forms a return circuit for the inductive motor current $i_2$.

FIGURE 3 shows a D.C. motor control in which a semi-conductor switch controlled rectifier $H_1$ is used, which is particularly suited for this purpose, since after the ignition, it can conduct large currents without any substantial power consumption. As the controlled rectifier after the ignition can be quenched only by the removal of the applied voltage or by a reversal of the polarity thereof, it is provided with a quenching circuit in a manner known per se. This quenching circuit in the present embodiment comprises a series connection arrangement of a capacitor C and a second controlled rectifier $H_2$ which is connected parallel to the first controlled rectifier. A D.C. charging voltage source is connected to the points 1 and 2 by means of a load resistor R. The supply voltage source Q is suitably used as D.C. charging voltage source.

The operation will subsequently be explained. First both controlled rectifiers are assumed to be in the blocking state. Now, an ignition pulse is delivered to the controlled rectifier $H_1$ by the pulse emitter IG. The controlled rectifier $H_1$ is thereby ignited, a current $i_1$ starts to flow through the motor, and the capacitor C will be charged by way of a resistor R and the rectifier $H_1$. After the desired duration of current flow, an ignition pulse is delivered to the second controlled rectifier $H_2$ by means of the pulse emitter IG. Thus the rectifier $H_2$ is ignited and the voltage of the capacitor is applied to the rectifier $H_1$. A reversal of voltage is thereby effected on the rectifier $H_1$ which thus will be quenched. The capacitor C then is reversely charging via the motor current circuit and the rectifier $H_2$, until its voltage equals the source voltage U. At this moment an inductive motor current $i_2$ starts to flow through the diode D. At the renewed ignition of the rectifier $H_1$, the voltage of the capacitor is in blocking direction applied on the rectifier $H_2$ and the latter will be quenched. The capacitor is reversely charging through the resistor R and the rectifier $H_1$, and the cycle starts anew. As long as current flows through the rectifier $H_1$, the voltage U of the voltage source Q is applied to the motor, while during the blocking time of the rectifier $H_1$ after the capacitor C has been reversely loaded, no voltage is applied to the motor. By varying the proportion between the current flow period of the rectifier $H_1$ and the blocking period thereof, the mean voltage applied to the motor and thus the motor current is varied.

For obtaining an increase in blocking voltage, a semi-conductor switch may also have a plurality of switching semi-conductors connected in series, and for enlarging the current range a plurality of semi-conductors may be connected in parallel arrangement.

I claim:
1. In a control system for a direct-current motor having a controlled rectifier acting as an alternately conducting and blocking electronic switch and forming a current circuit together with a source of direct-current voltage and at least one direct-current motor, said rectifier being connected in parallel arrangement with a series circuit consisting of a capacitor and a second controlled rectifier, means providing a current path leading from said source to the interconnection of the capacitor and the second controlled rectifier, one diode arranged in series connection with the motor, means providing a current path leading from said source to the interconnection of the capacitor and the first controlled rectifier and pulse emitter means alternatively delivering ignition pulses to the controlled rectifiers.

2. A control of a direct-current motor according to claim 1, in which the means providing the second current path comprises a resistor connected to the source of direct-current voltage.

3. In a control system for a direct-current motor having a controlled rectifier acting as an alternately conducting and blocking electronic switch and forming a current circuit together with a source of direct-current voltage and at least one direct-current motor, said rectifier being connected in parallel arrangement with a series circuit consisting of a capacitor and a second controlled rectifier, means providing a current path leading from said source to the interconnection of the capacitor and the second controlled rectifier: one diode arranged in parallel connection with the motor, means providing a second current path leading from said source to the interconnection of the capacitor and the first controlled rectifier and pulse emitter means alternately delivering ignition pulses to the controlled rectifiers.

References Cited
UNITED STATES PATENTS

| | | | |
|---|---|---|---|
| 3,198,989 | 8/1965 | Mahoney. | |
| 3,127,550 | 3/1964 | Gilbreath et al. | 318—331 |
| 3,195,029 | 7/1965 | Gilbreath | 318—246 |
| 3,214,667 | 10/1965 | Foster et al. | 318—331 |

ORIS L. RADER, *Primary Examiner.*

J. C. BERENZWEIG, J. J. BAKER, *Assistant Examiners.*